United States Patent [19]
Yang

[11] Patent Number: 5,912,537
[45] Date of Patent: Jun. 15, 1999

[54] APPARATUS FOR LIFTING UP AND DOWN WINDOW GLASS FOR VEHICLE AND METHOD THEREOF

[75] Inventor: Jeong-Mo Yang, Seongnam, Rep. of Korea

[73] Assignee: Sam Sung Motors, Inc., Seoul, Rep. of Korea

[21] Appl. No.: 08/944,013

[22] Filed: Sep. 30, 1997

[30] Foreign Application Priority Data

Oct. 2, 1996 [KR] Rep. of Korea ........................ 96-43755
Sep. 10, 1997 [KR] Rep. of Korea ........................ 97-46514

[51] Int. Cl.$^6$ .............................. G05B 11/18; G05B 1/06
[52] U.S. Cl. .......................... 318/280; 318/663; 318/265; 318/286
[58] Field of Search ...................................... 318/268–293, 318/640–668; 360/10.3, 33.1, 71, 73.08, 69, 61, 137; 341/190, 176, 20, 22, 23; 200/14; 340/825.22, 825.36; 348/734

[56] References Cited

U.S. PATENT DOCUMENTS

| | | | |
|---|---|---|---|
| 4,556,835 | 12/1985 | Vogel | 318/663 |
| 4,866,542 | 9/1989 | Shimada et al. | 360/10.3 |
| 4,931,714 | 6/1990 | Yamamoto | 318/663 |
| 4,940,926 | 7/1990 | Periou | 318/265 |
| 5,194,999 | 3/1993 | Nakajima et al. | 360/69 |
| 5,508,703 | 4/1996 | Okamura et al. | 341/176 |
| 5,710,544 | 1/1998 | Choi | 340/825.22 |

FOREIGN PATENT DOCUMENTS

| | | | |
|---|---|---|---|
| 4066322 | 2/1992 | Japan | B60S 1/17 |
| 2198860 | 6/1988 | United Kingdom | E05F 15/16 |

*Primary Examiner*—Paul Ip
*Attorney, Agent, or Firm*—Howard S. Reiter; Steve S. Cha

[57] ABSTRACT

The present invention provides an apparatus for lifting up and down of window glass for a vehicle and method thereof that is controlled by a switch called a shuttle switch to move the window glass automatically to a desired position according to the rotation of the shuttle switch without visually checking the movement of the window glass and without taking eyes away from the road by a user. The present invention includes a reversible motor for moving the window glass, a controller for moving and stopping the window glass to the desired position corresponding to the rotation of the shuttle switch, and a motor sensor providing feedback to the controller for stopping the movement of the window glass.

9 Claims, 5 Drawing Sheets

APPARATUS FOR LIFTING UP AND DOWN WINDOW GLASS FOR VEHICLE AND METHOD THEREOF

FIELD OF INVENTION

This invention relates to an apparatus for lifting up and down window glass for a vehicle and method controlling the same. The window glass of a vehicle is lifted up and down in accordance with the rotation of a switch called a shuttle switch (jog shuttle member) to a desired position without observing the upper portion of the window glass by a user. This apparatus uses a shuttle switch for lifting up and down the window glass corresponding to the rotation of the shuttle switch, and further includes the following: a reversible motor rotating in both direction for displacing the window glass for the vehicle to a lifted up and down position; a motor sensor detecting the movement of the window glass(lifting information) by analyzing the rotation frequency of the reversible motor; a shuttle switch located inside of the vehicle next to a passenger for providing position signals corresponding to the rotation and direction of the rotation of the shuttle switch activated by the user; a controller comparing the position signals from the final position and the prior position of the shuttle switch and outputting signals for displacement of the window glass and a direction of the movement of the window glass, and further receiving output signals from the motor sensor for stopping the movement of the window glass; and, a motor driver providing voltage to the reversible motor to a desired displacement and direction of the movement of the window glass.

BACKGROUND OF THE INVENTION

The present invention relates to an apparatus for lifting up and down window glass for a vehicle and method for controlling the apparatus, and more particularly to a rotating member of a shuttle switch and a controller for lowering and raising a window glass for a motor vehicle to a desired position accurately in accordance with an angle and direction of rotation of the shuttle switch.

Presently, there have been several methods used for lowering and raising the window glass for motor vehicles. One known method is using a leveler which is connected to a window glass and its attached lifting gears to open the window glass by manually turning the leveler. An another method is using a push button switch which activates a motor to lower and raise window glass. These types of methods are known as a power window glass.

The common power window glass for opening and closing window glass of a vehicle typically uses an up-and-down switch or a push button(seesaw type) switch to activate a motor to rotate either in a clockwise or a counterclockwise direction. These switches are commonly used for activating an electric motor. However, these common power window glasses are inconvenient to open and close window glass because they do not allow a driver or a passenger of the vehicle to move the window glass to a desired position without spontaneously checking the movement of the window glass and continuously manipulating with the switch to reach that desired position.

In order to eliminate the aforementioned problem, a Japanese inventor, "Yamamoto" utilizes a slide rheostat as a switch to open window glass of vehicles to a desired position without visually checking the displacement of the window glass by a user. This invention of "Yamamoto" is described in U.S. Pat. No. 4,931,714 (Title of the invention: DEVICE FOR LIFTING UP AND DOWN WINDOW GLASS FOR VEHICLE).

However, the composition of the invention according to "Yamamoto," which includes a reversible motor and a potentiometer connected to the drive gears to produce an output that is proportional to the lifting position of the window glass, is very complicated.

Accordingly, the object of the present invention is to provide a window lifting up and down device and method for controlling the same for a motor vehicle characterized by using a shuttle switch to lift up and down the window glass in accordance with the rotation and direction of the rotation of the shuttle switch.

According to this aspect of the present invention, there is provided a reversible motor rotating corresponding to output position signals, a motor sensor detecting the displacement of the vehicle window glass by detecting the rotation frequency of the motor; a shuttle switch providing position signals and direction of the rotation of the shuttle switch which is located inside the vehicle; a controller to compare the position signals from the final position and prior position of the shuttle switch to determine the movement of the window glass and the direction of the rotation of the shuttle switch corresponding to compared position signals, and to receive the output of the motor sensor for stopping the movement of the window glass; and a motor driver providing current to the motor in response to the compared position signals indicative of direction and displacement of the window glass.

A BRIEF DESCRIPTION OF THE DRAWINGS

FIG. 1a perspective view of the shuttle switch according to an embodiment of the present invention;

DETAILED DESCRIPTION OF THE PREFERRED EMBODIMENTS

The present invention is explained accordingly to the figures provided herein. The following explanations relating to this invention contain only the important aspect of this invention, and otherwise unimportant explanations to understand this invention are omitted.

Figure 1A:
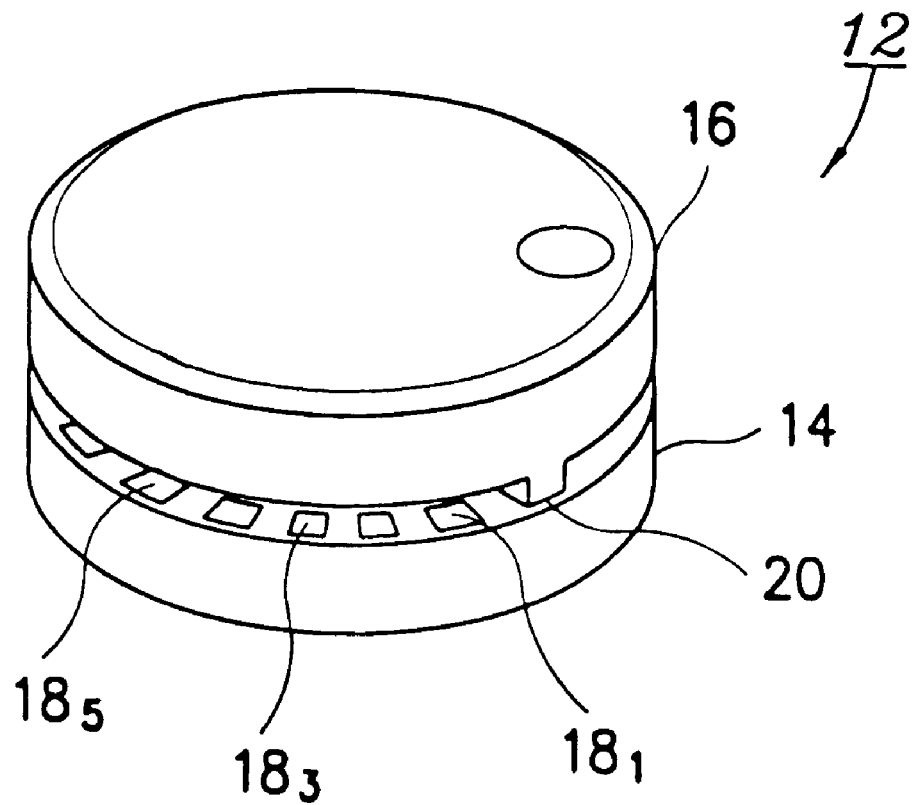
FIG. 1b illustrates a bottom view of the rotating member according to an embodiment of the present invention.
FIG. 1c illustrates a top view of the fixed electrode plate according to an embodiment of the present invention.
FIG. 1d illustrates a cross-sectional view of the shuttle switch according to an embodiment of the present invention.
FIG. 1e illustrates an enlarged diagram for showing a step during when the electrode ball is coupled to one of the sensing electrode in accordance with an embodiment of the present invention.
Figure 1B:
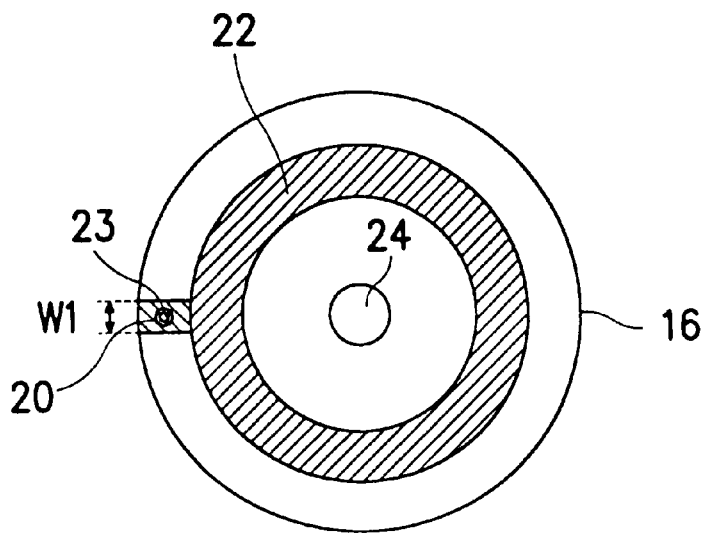
Figure 1C:
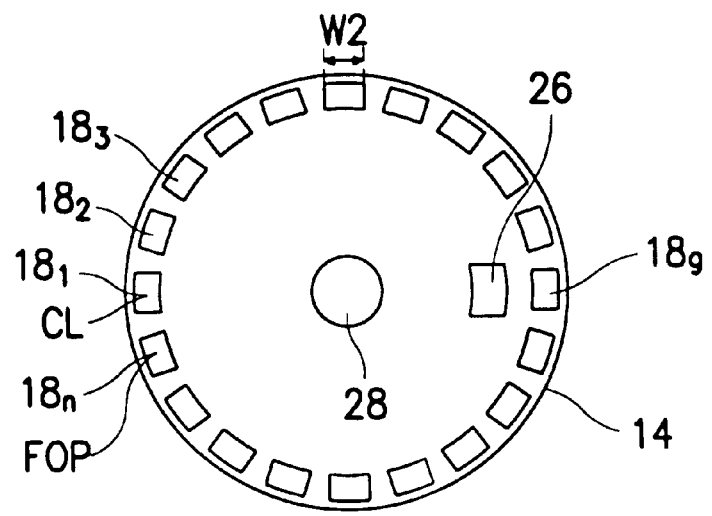
Figure 1D:
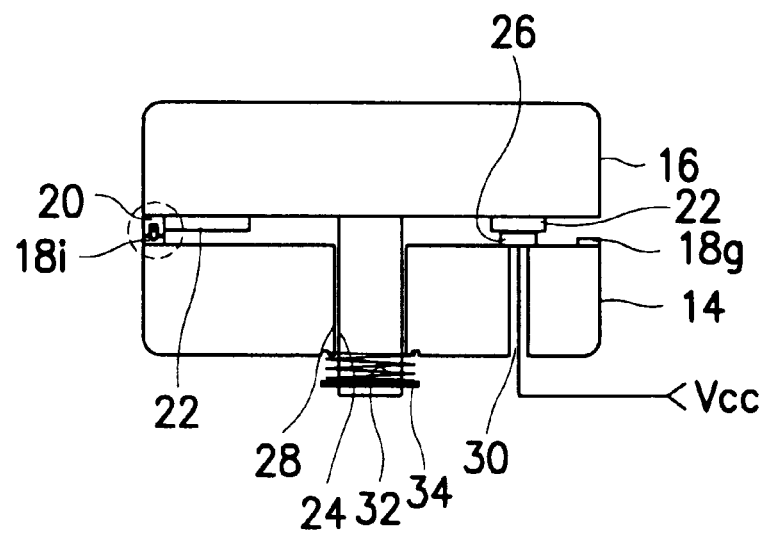
Figure 1E:
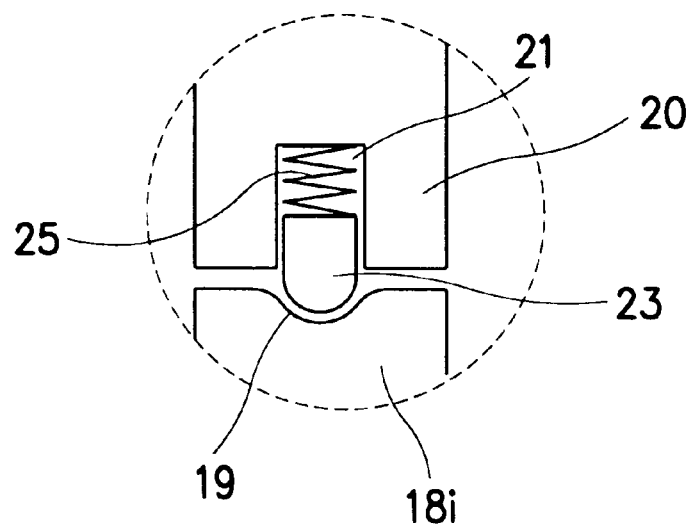

FIGS. 1a illustrates a front perspective view of the shuttle switch; FIG. 1b illustrates inside of the top portion of the shuttle switch; FIG. 1c illustrates inside of the bottom portion of the shuttle switch; FIG. 1d illustrates side view of the shuttle switch; and FIG. 1e illustrates an enlarged portion of the side view of the shuttle switch as shown in FIG. 1d.

In FIG. 1a, a shuttle switch 12 according to the invention includes a fixed electrode plate 14, and a rotating member 16 being rotatably coupled to the center of the electrode plate 14. The electrode plate 14 being negative plate have a plurality of sensing electrodes $18_i$ (i do not include zero, and starts with 1, 2, 3, 4, . . . whole number), being radially spaced, mounted along the circumference of the electrode plate 14. Moreover, the bottom of the rotating member 16 includes a position electrode 20 connected to a car battery when the ignition switch(drawing omitted) is "ON" position.

FIG. 1b shows a bottom view of the rotating member 16. The rotating member 16 includes the position electrode 20 connected to an annular disk electrode 22. The annular disk electrode 22 mounted on the rotating member 16 receives a constant voltage, Vcc, through a battery connector mounted on the electrode plate 14. This electric power supply, Vcc, is more easily shown in the FIGS. 1c and 1d. The rotating member 16 rotates about its center member 24.

FIG. 1c shows the annular disk electrode 22 being under constant contact with the battery connector 26 of the electrode plate 14, and the electrode plate having a plurality of sensing electrodes $18_i$ being evenly spaced along the circumference of the electrode plate 14. The length of these sensing electrodes $18_i$, are smaller than the length of the position electrode 20, and the width of the sensing electrodes $18_i$, W2, is the same or larger than the width of the position electrode 20, W1. Further, there is an opening 28 located in the center of the electrode plate 14 for receiving the center member 24. This electrode plate 14 as described in the above is located inside interior of the vehicle, for example, on the inside door panel or near a handle of a door panel.

FIG. 1d illustrates a side view of the shuttle switch 12 as described in FIG. 1b and 1c including the rotating member 16 and the electrode plate 14 being rotatably coupled together. FIG. 1d shows a connection of a car batter to the battery connector 26 of the electrode plate 14 through a second opening 30. The FIG. 1d also includes a spring 32 and an E-ring 34 being attached to the end of the center member 24 functioning to prevent the electrode plate 14 to escape away from the rotating member 16.

FIG. 1e illustrates an enlarged view near the position electrode 20 as shown in the FIG. 1d. FIG. 1e includes a click stop pointer 19 having a concave down shape on the top of each sensing electrode $18_i$ of the electrode plate 14. Also, the position electrode 20 of the rotating member 16 has in its center a third opening 21 at the bottom for receiving an electrode ball 23 having a coil spring 25 fastened at one end. According to the aforementioned construction, the rotating member 16 is stopped and prevented from further rotating movement whenever the electrode ball 23 is located on the click stop pointer 19 of the sensing electrode $18_i$.

When the rotating member 16 of the shuttle switch 12 rotates about the center member 24, the position electrode 20 and the annular disk electrode 22 being powered by the battery connector 26 contacts electrically with one of the sensing electrodes $18_i$. Accordingly, when the sensing electrode $18_i$ of the electrode plate 14 is in contact with the position electrode 20, hereinafter called $18_j$ (does not include zero, and starts with 1, 2, 3, 4, . . . whole number), a "high" signal is produced, and a "low" signal is produced $18_k$, (k is not equal to j) when there is no contact between the position electrode 20 and one of the sensing electrodes $18_i$.

Figure 2:
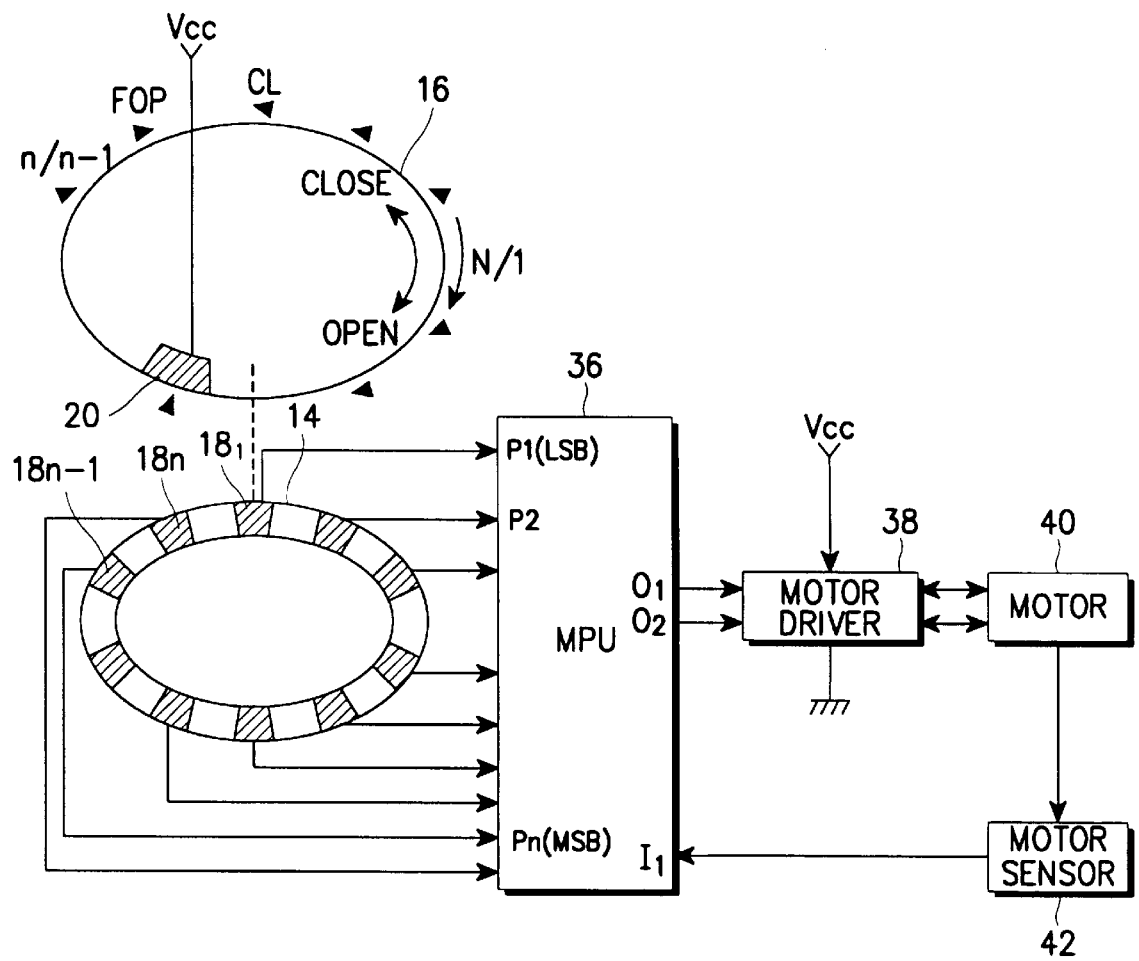
FIG. 2 illustrates another view of the shuttle switch having a rotating member and an electrode plate and its interrelationship with respect to a motor driver, a reversible motor, and a motor sensor.

In FIG. 2, the composition of a shuttle switch for opening and closing the window glass is shown in relation to the rotating direction of the shuttle switch.

FIG. 2 illustrates the shuttle switch according to the present invention including the rotating member 16, the electrode plate 14, a controller 36 and a motor driver 38 activating a reversible motor 40 in accordance with the rotating degree of the rotating member 16. The above mentioned controller refers to a microprocessor which includes ROM for storing programs and RAM for accessing data.

In FIG. 2, the microprocessor (hereinafter named "MPU") 36 includes input ports P1–Pn, corresponding with the respective sensing electrodes $18_1$–$18n$. The MPU 36 includes output ports O1 and O2 which are connected to the input terminal of the motor driver 38, and the output of the motor driver 38 is connected to the reversible motor 40. The motor sensor 42 is connected between the reversible motor 40 and the input port II of the MPU 36 detecting the rotation frequency of the reversible motor(RPM). This motor sensor 42 is connected to a second sensor (not shown in the drawing) whose output resets the motor sensor 42 and the MPU 36 when the glass window is completely closed.

The reversible motor 40 is connected to gears(not shown in the drawing) for lifting down and lifting up of window glass of a vehicle. In FIG. 2, the rotating member 16 shows labels CL(closure), FOP(full open), and an arrow indicating the direction of these labels.

Figure 3:
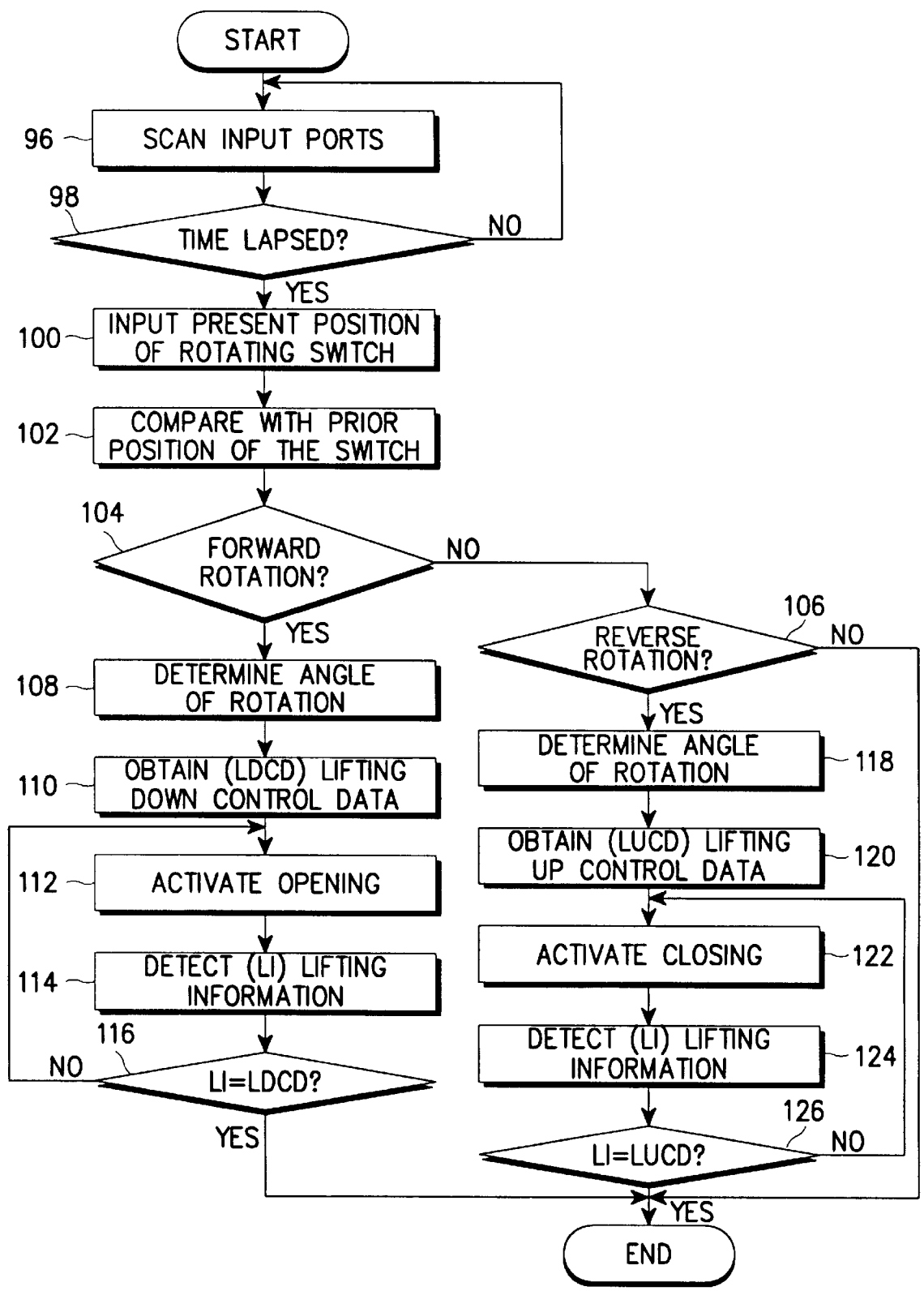
FIG. 3 illustrates a flow chart showing the steps of a microprocessor used to activate the opening and closing of the window glass.

FIG. 3 is a flow-chart illustrating the control program of the microprocessor for controlling the lifting up and down of window glass in accordance with present invention.

Prior to explaining this flow chart, it is necessary in order to understand the present invention to assume that the position electrode 20 of the rotating member 16 contacts electrically with the sensing electrode $18_1$ of the electrode plate 14, and the vehicle window glass is in a completely closed position. At this instance, the position signal which reflects this present closed position represents the prerecorded position prior position of the rotating member 16.

In accordance with the present invention, a driver or a passenger rotates the rotating member 16 of the shuttle switch 12 as shown in FIG. 1a to a certain degree and the position electrode 20 contacts electrically with one of the sensing electrodes $18_i$ of the electrode plate 14.

For an example, if the position electrode 20 of the rotating member 16 contacts electrically with the sensing electrode $18_3$ or $18_{n-1}$, the following position signals will be provided to the input ports P1–Pn of the MPU 36 as shown:

TABLE 1

| Position electrode 20 vs Sensing electrode $18_i$ | Pn, | Pn- | P5, | P4, | P3, | P2, | P1 |
|---|---|---|---|---|---|---|---|
| 20 electrically contacted with $18_3$ | 0, | 0- | 0, | 0, | 1, | 0, | 0 |
| 20 electrically contacted with with $18_{n-1}$ | 1, | 0- | 0, | 0, | 0, | 0, | 0 |

In step 96, the MPU 36 as described in FIG. 2 scans the input ports P1–Pn and checks to see if a prescribed time has passed, and this step is executed routinely until the prescribed time has elapsed. This prescribed time is determined by the amount of time it takes a passenger to turn the rotating member 16 to one complete rotation. For an example, if it takes about one to two seconds to complete one rotation, the MPU 36 records the position signal in the input ports P1–Pn after this time has passed as shown in the FIG. 3 in the step 100. The reason for scanning the input port P1–Pn after the lapse of the above mentioned prescribed time is to prevent unnecessary position signals between the last position, $P_3$, and the present position, Pn, such as $P_2$, $P_3$–$P_{n-2}$.

The present position signal responsive to the rotation of the rotating member 16, which is stored in the MPU in the step 100 of the FIG. 3, is compared with the pre-recorded prior position signal stored in the memory in step 102. After the comparison of the present position signal and the prior position signal stored in MPU 36, an analysis as to the forward or the reverse rotation of the rotating member 16 in relation to the prior position is conducted in steps 104 and 106. This analysis is accomplished in the following principle.

If the prior position signal which is recorded earlier is larger than the present position signal, a forward rotation (direction towards opening of the glass window) of the rotating member 16 is determined, and otherwise, a reverse rotation of the rotating member 16 is determined, as shown in the table 2.

TABLE 2

Table for determining the direction of the rotation of the rotating member.

| Prior position data Pn - P1 | Present position data Pn - P1 | Direction of the rotation |
|---|---|---|
| 00000 ------- 00100 | 00000 -------- 01000 | Forward direction |
| 00000 ------- 00100 | 00000 -------- 00010 | Reverse direction |

If a forward rotation in the step 104 is determined, the MPU 36 will output an angle of rotation in step 108. This angle of rotation is calculated in the MPU 36 program according to the number of sensing electrodes $18_i$ as described in the FIG. 1c. For instance, if there were 36 sensing electrodes located in the electrode plate 14, each sensing electrodes $18_i$ represents an angle of ten($10°$), and consequently, the angle of rotation in step 108 will vary at an increment of ten degrees as the position electrode contacts each of the sensing electrodes $18_i$ in sequence.

In step 110, the MPU 36 obtains LDCD(lifting down control data) of the opened window glass which correspondences to the angle of rotation determined in the step 108, and temporarily stores the matching LDCD data. The LDCD is predetermined data that is pre-recorded in the memory representing the displacement of the window glass corresponding to the angle of rotation. After obtaining the LDCD which matches the angle of rotation and temporarily storing in the MPU 36, the MPU 36 outputs a moving signal in a forward rotation to the motor driver 38 corresponding to the matched LDCD.

The motor driver 38 in response to the moving signal provides the batter voltage, Vcc, and ground(GND) in a forward direction to the motor 40 corresponding the matched LDCD. The reversible motor 40 is activated in a forward rotation in accordance with the output of the motor driver 38. The speed(RPM) of the motor 40 is constant provided that the battery voltage, Vcc, is constant. At this instance, the motor sensor 42 detects the speed(RPM) of the motor 40, and outputs signals to the MPU 36 which can be used to generate lifting information(LI). The LI obtained in response to the rotation frequency of the motor 40 reflects the movement of the window glass, and the LI data is generated in counting up or counting down fashion.

After reading rotation frequency from the motor sensor 42 in step 114, the MPU 36 compares the LI to the LDCD. If the LDCD is smaller than the LI value, the MPU 36 assumes that the glass window has not reached the desired position as directed by the rotating member 16 and repeats the step 112 until the LI value becomes equal to the LDCD.

Accordingly, a simple rotation of rotating member 16 as shown in the FIG. 1a to a specified rotated degree toward an opening direction causes the widow glass of the vehicle to open to a desired position.

If the rotating member 16 were not rotated in a forward direction as in the step 104, the MPU 36 checks for a reverse rotation of the rotating member 16. If the reverse rotation is detected, the MPU 36 executes the identical steps as previously described in the steps of 108, 112, 114 and 116 in the following steps of 118, 120, 122, 124 and 126, respectively, for closing the window glass. Similar to the LDCD in the step 110, the lifting up control data(LUCD) indicative of the displacement of the window glass corresponding to the rotated angle of the rotating member is provided in the step 120.

Accordingly, the present invention relates to a shuttle switch 12 having a rotating member 16 which opens and closes the glass window of a vehicle in accordance with the rotating degree of the rotating member 16.

Moreover, although the motor sensor 42 which detects the speed(RPM) of the motor 40 is used as in the previous paragraphs as a working model to obtain the lifting information(LI), one skilled in art knows that there are other sensors to detect the rotation frequency of the motor 40 such as RPM sensor or Hall sensor.

If the hall sensor were used as a motor sensor 42, the MPU 36 counts the pulse signals from the hall sensor to determine the lifting information. This method of counting the pulse signals to determine the movement of window glass is easily accomplished by a simple program to interrelate the rotation frequency of the motor and the ratio of the gears attached to the motor.

As explained in the above, the present invention allows a driver or a passenger to use the shuttle switch and its rotating member 16 located inside of the vehicle to open the window glass automatically to a desired position acutely without visually checking the movement of the window glass for a vehicle.

What is claimed is:

1. An apparatus for moving up and down the window glass of a vehicle having a battery, said apparatus comprising;
   a reversible motor for moving up and down window glass of said vehicle;
   a shuttle switch movable through a plurality of positions for producing a plurality of position signals corresponding to predetermined positions; and
   a controller coupled between said switch and said motor for moving and stopping said motor in a predetermined position in response to one of said position signals.

2. An apparatus as described in claim 1, which further includes a motor driver coupled between said controller and said motor for driving said motor to one of said predetermined positions.

3. An apparatus as described in claim 1, which further includes a hall sensor coupled between said motor and said controller for providing feedback to said controller corresponding to rotation frequency of said motor.

4. An apparatus as described in claim 1, wherein said shuttle switch has a rotating element and a electrode plate element and said rotating element is rotatably coupled to a center of said electrode plate member and further includes a position electrode located on said rotating member, a plurality of sensing electrodes evenly spaced along the circumference of said electrode plate element wherein said position electrode contacts electrically with one of said sensing electrodes in sequence for producing said position signals in response to rotation of said rotating element.

5. An apparatus as described in claim 2, which further includes an annular disk electrode mounted on said rotating member and connected to said position electrode for receiving power from said battery.

6. An apparatus as described in claim 1, which further includes a click stop pointer having a concave down shape on top of each said sensing electrodes, and an electrode ball coupled to bottom of said position electrode for engaging said electrode ball in locking position with said click stop pointer.

7. A method for moving up and down the window glass of a vehicle utilizing a rotating element, comprising the steps of:

provided pre-recorded data indicative of displacement of said window glass corresponding to a specified angle of rotation of said rotating element;

detecting a first digital signal indicative of a first position of said rotating element and a second digital signal indicative of a second position of said rotating element;

comparing the value of said first digital signal to the value of said second digital signal to determine the direction of motion of said rotating element from said first position to said second position and to determine an angle difference between said first position to said second position;

comparing said angle difference between said first position and said second position to said pre-recorded data to identify a pre-recorded data corresponding to said angle difference; and moving said window glass to a predetermined position in accordance with said direction of motion of said rotating element from said first position to said second position, and corresponding to said matching pre-recorded data.

8. The method as described in the claim 7, wherein said detecting of said first digital signal and said second digital is performed after a predetermined time has lapsed to avoid unnecessary digital signals between said first position and said second position.

9. The method as described in the claim 7, further comprising the steps of:

detecting pulse signals from said hall sensor corresponding to the rotation frequency of said motor;

providing lifting information indicative of said displacement of said window glass using said pulse signals; and stopping said window glass when said lifting information equals to said matching pre-recorded data.

* * * * *